United States Patent Office 3,129,159
Patented Apr. 14, 1964

3,129,159
PROCESS FOR MANUFACTURING MEMBRANES
Karl-Heinrich Maier, Gottingen, and Wolfgang Grassmann, Munich, Germany, assignors to Firma Membranfiltergesellschaft G.m.b.H., Gottingen, Germany, a corporation of Germany
No Drawing. Filed Sept. 29, 1961, Ser. No. 141,640
2 Claims. (Cl. 204—180)

The present invention relates to a process for manufacturing membrane films, more particularly, to forming membrane films having a cellulose acetate base and adapted for the separation of colloidal solutions and suspensions by electrophoresis.

This is a continuation-in-part of patent application Serial No. 829,981, filed July 28, 1959, now abandoned.

Suspended or colloidal particles have been separated from a liquid by the use of suitable filter papers in conjunction with the phenomenon of electrophoresis. One well-known application is in the medical field in order to ascertain the protein picture in routine medical examinations. In this method the transparent filter material was measured by suitable instruments. However, sources of errors were present due to the insufficient transparency of the filter papers as well as the tendency of the filter paper to absorb proteins passing therethrough. For these reasons attempts were made to replace these filter papers by other filter materials which would give more accurate results.

Reports have been made on tests wherein diaphragm membranes were used instead of filter papers. These membranes corresponded approximately to diaphragm filters in their characteristics and were similar to those used in filtering bacteria (J. Kohn: J. of Physiol., 135, 9P (1957)). It was found that such diaphragm filters had great advantages over filter papers both with respect to their separation capacity and transparency.

Whether a particular diaphragm membrane is suitable for separating proteins from protein-containing liquids, such as for example serum, by means of electrophoresis into individual fractions and then indicating the percentage distribution of the proteins largely depends on the physical properties of the components of the membrane.

Such membranes must be particularly porous and be readily susceptible to good wetting with respect to the liquid in which the membrane is to be used. The membrane structure must be sufficiently porous so as to permit the passage therethrough of the migrating protein molecules. Further, the chemical properties of the surfaces of the membrane must be such as to preclude any absorption of the proteins by the membrane so that the various fractions of the particles may uniformly migrate simultaneously with an accurate separation of these fractions.

In addition, the several fractions of proteins formed by the separation process must so color the membrane that the colors are distinct but the coloring can be completely removed after the test has been completed. After the membrane has passed through a dyebath and a bath for removing the colors, it should regain its maximum transparency.

It is also important that such a membrane must remain elastic and resilient after the several treating steps and should not exhibit any tendency to shrink.

It is therefore the principal object of this invention to provide a novel and improved process for producing a membrane particularly adapted for the separation of particles by electrophoresis.

It is another object of this invention to provide an improved method for obtaining transparency in a membrane to be used in the separation of particles from a liquid.

It is a further object of this invention to provide a membrane for the separation of particles from a liquid which incorporates all of the above-mentioned properties desired in such a membrane to a considerably greater degree than in previously known membranes.

Among the cellulose esters, the cellulose acetates are generally more suitable for the production of membranes used in electrophoresis than are the cellulose nitrates. The former are better suitable, because of the more favorable chemical surface properties of the cellulose acetates. However, commercially manufactured types of cellulose acetates, which differ from each other in that they contain different groups of acetates, are not particularly suited or are wholly inaccurate for use in separation by electrophoresis. By way of example, a cellulose acetate known as Cellit T, and containing about 61% acetic acid and corresponding approximately to a triacetate, does not meet any of the above-mentioned requirements for membranes when used in separation by electrophoresis.

By way of another example, membranes have been formed from a cellulose acetate having an acetic acid content of about 53.5% and corresponding approximately to a diacetate. This cellulose acetate is known as Cellit L. Such a membrane has some of the basic requirements of a membrane as described above but these properties are attained to such a low degree that the optimum requirements for a membrane are not at all met.

In the subsequent description of a specific embodiment of the process of the present invention, the designations triacetate and diacetate will be used, but it should be borne in mind that these products deviate somewhat in their content of acetic acid from the theoretical composition. When such products are used as membranes, a certain separation of particles can be obtained. However, this separation is rather irregular, so that it must be generally concluded that these membranes are not suitable.

By way of comparison with the above two examples of specific forms of cellulose acetates, an adequate or even a very satisfactory membrane can be obtained from mixtures of triacetate and diacetate in predetermined proportions. Adequate and even extremely satisfactory membranes can be obtained from mixtures containing from 90 to 50% of diacetate and from 10 to 50% of triacetate. Mixtures having 75 to 66% of diacetate and 25 to 34% of triacetate can also be used to produce extremely satisfactory membranes.

The permeability of the diaphragm membranes produced from the various cellulose acetates with respect to liquids in a filtration process under predetermined conditions can be considered as a measure for the porosity or fineness of structure of the membrane. By way of example, when the proportion of cellulose triacetate is increased in a membrane which is initially comprised of 100% of cellulose diacetate, a gradual increase in the permeability is obtained during a filtration time of 26 seconds for 100 milliliters of $H_2O$ on an effective filter area of 12.5 cm.$^2$ and a filtration pressure of 70 centimeters' mercury. This increase in permeability is obtained up to a proportion of about 36% of cellulose triacetate during a filtration time of 2.5 seconds. When the proportion of cellulose triacetate is increased beyond 36%, the permeability drops rapidly. In addition, when more than 50% of triacetate is included in the cellulose acetate mixture, there is obtained an amorphous substance.

Since the manufacture of such membranes involves a colloidal chemical process, the specific nature of the solvents as well as the proportions of solid substances and cellulose esters are important. The composition of the constituents of the solvents affects the porosity of the membrane, any shrinkage tendency of the membrane, the elasticity and resiliency thereof and certain technical properties which are of importance in the production of the membrane, such as an excessive or insufficient adhesion of the finished membrane to its base or carrier member.

It has been known to use mixtures of two or more different solvents in the manufacture of such membranes. One of these solvents is for the purpose of dissolving the solid substances such as the cellulose acetates and the other solvent functions as the swelling or expansion agent with respect to the solid substances in the membrane. Such expansion agents have the function to maintain the membrane structure in a porous condition and thus are essential to the ultimate nature of the structure of the membrane.

When forming a membrane from a mixture of cellulose diacetate and cellulose triacetate, the solvent must be such that the solubility of both components is substantially the same therein. It has been found that for manufacturing membranes out of such mixtures, methylene chloride ($CH_2Cl_2$) is particularly suitable. Methylene chloride is a good solvent for both cellulose diacetate and cellulose triacetate, particularly in combination with small amounts of butyl alcohol in the ratio of 9:1. Methylene chloride does not mix with water and possesses a low volatilisation number. Isobutyl alcohol is particularly suitable for use as an expanding agent in the manufacture of such membranes. Isobutyl alcohol has been found to be superior to a normal butyl alcohol.

The membrane films obtained by the above-described mixtures of solid substances and solvents generally possess good wetting properties. In the event these wetting properties are not completely developed after the evaporization of all of the volatile components of the film, and after the complete gelatinization of the film, the wetting properties can be considerably improved by subsequently heating the film to a temperature of about 100° C. for a short period of time.

Since such irregularities in the wetting properties contribute to the difficulties in the manufacture of the membrane, and hence require a considerable amount of work to overcome, according to the present invention the wetting properties can be increased by adding 0.01 to 0.1% of commercial wetting agents (also known as wetting-out agents) such as low fat alcohols having a carbon content of $C_{12}$-$C_{14}$. These wetting agents modify the surface tension of liquids (or interfacial tensions) and promote quicker, better and more even wetting and penetration of the porous membrane. The membrane to which such a wetting agent has been added will have optimum wetting properties.

One of the disadvantages of membranes having a cellulose acetate base is that such membranes having a definite tendency to brittleness which is a great handicap in the handling and processing of such membranes. Accordingly, the present invention proposes to add about 1.5% of glycerin to the mixture of solvents in order to obtain an elastic and resilient diaphragm which is not brittle.

The membrane films obtained by the process of the present invention have optimum properties with respect to their capacity to absorb, their wetting properties, their coloration by proteins, and their mechanical properties. The transparency of these membranes is so ideal that the Lambert-Beer law is readily fulfilled. The manufacture of membranes according to the process of the present invention provides for a wholly new process in order to obtain transparent membranes. Previously, such membranes and other papers were rendered transparent by impregnating them with so-called transparency oils. However, in the present process, the new membrane is rendered completely transparent by a consolidation of its structure.

A specific embodiment of the present invention is described in the following specific example which is not limitative of the invention, but is intended to be illustrative thereof.

*Example*

18 grams of cellulose diacetate and 10 grams of cellulose triacetate in the form of white flakes or granules are dissolved by stirring for two hours in a solvent consisting of 360 milliliters of methylene chloride and 40 milliliters of butyl alcohol. 7 milliliters of glycerin are added to the mixture of solvents. After the cellulose acetates have been dissolved in the solvents, 200 milliliters of isobutyl alcohol and 0.2 gram of low fat alcohol having a carbon content of $C_{12}$-$C_{14}$ are added. The result is a viscous solution having a viscosity of about 1000 to 2000 centipoises.

This viscous solution is then applied as a thin layer of uniform thickness onto a base or carrier of glass or steel. The film is subjected to an atmosphere having a temperature of 20° C. and a relative humidity of 60%. This atmosphere provides constant evaporation conditions.

After drying for about 4 hours, the film contains less than 2% of the solvents and is now in the form of a pure white porous film having fine pores with an average size of about 2 microns. The air spaces formed by the pores, indicative of the porosity of the film, have a volume of about 85%. There are approximately $10^7$ pores per square centimeter of film.

After further drying for about 20 hours, the dry film comprises solid substances which are about 5% of the entire original mixture and the solvent remaining in the film is less than 1%. After this drying for a total time of 24 hours, the film has a porosity or air space volume of 80 to 85%.

This film is then removed from its base and divided into pieces of desired sizes depending on the ultimate use thereof.

The membrane film is then used to separate colloidal or suspended particles from a liquid using the phenomenon of electrophoresis. After the separation and coloration process has been completed, the membrane film is sprayed with a glacial acetic acid which is obtained commercially with a concentration of 98%. The several protein fractions are sharply marked and colored on the membrane and the membrane film can now be photographed to record the results of the separation.

The sprayed membrane film is then dried at 100° C. for 15 minutes. The resulting film now has air spaces with an average size of 25 microns and the film is now thin and transparent. This transparent film with the protein fractions clearly marked thereon can then be satisfactorily used in various optical instruments to measure the results of the separation process.

Thus it can be seen that the present invention provides a process for manufacturing membranes which are particularly adapted for use in the separation of particles through electrophoresis. In addition, the present invention provides a process for obtaining highly transparent films without the use of so-called transparency oils. The membranes obtained by carrying out the process of the present invention readily fulfill all of the requirements and prerequisites which are deemed necessary in membranes used for the separation processes.

It will be understood that this invention is susceptible to further modification and, accordingly, it is desired to comprehend such modifications within the present invention, as may fall within the scope of the objects and the appended claims.

We claim:
1. A process of producing a micro-porous flexible membrane useful for the separation of colloidal solutions and suspensions by electrophoresis, said process comprising applying a cellulose acetate solution to a base to establish a film of said solution of uniform thickness, said acetate solution consisting essentially in parts by weight of 50 to 90% of cellulose diacetate, 10 to 50% of cel- lulose triacetate, and a solvent mixture of 9 parts methylene chloride and 1 part butyl alcohol, together with about 1.5% of glycerin, and about 0.1% of a low fat alcohol having a carbon content of $C_{12}$ to $C_{14}$ as a wetting agent and sufficient isobutyl alcohol to produce a viscous solution; thereafter subjecting said film to a drying atmosphere of approximately 60% relative humidity and at a temperature of 20° C. to evaporate substantially all of the solvent mixture therefrom until less than 1% of the solvent remains so that a gelatinization of the membrane is obtained.

2. A micro-porous membrane useful for the separation of colloidal solutions and suspensions by electrophoresis and which is produced in accordance with the process of claim 1.

References Cited in the file of this patent

UNITED STATES PATENTS

| | | |
|---|---|---|
| 1,983,623 | Ludecke | Dec. 11, 1934 |
| 2,591,077 | Lamborn | Apr. 1, 1952 |
| 2,739,069 | Fordyce | Mar. 20, 1956 |